United States Patent [19]

Petterborg et al.

[11] 4,134,646

[45] Jan. 16, 1979

[54] ROTATION CONTROL APPARATUS

[75] Inventors: Emil M. Petterborg; Robert A. Wood, both of Sunnyvale, Calif.

[73] Assignee: Power View Corporation, Sunnyvale, Calif.

[21] Appl. No.: 747,493

[22] Filed: Dec. 6, 1976

[51] Int. Cl.² .................... G02B 5/08; F16H 21/48
[52] U.S. Cl. .................................. 350/289; 74/63
[58] Field of Search ......................... 350/289; 74/63

[56] References Cited

U.S. PATENT DOCUMENTS 2,877,686  3/1959  Foster ............................... 350/289
3,830,561  8/1974  Lafave et al. ...................... 350/289

Primary Examiner—Jon W. Henry
Attorney, Agent, or Firm—John J. Leavitt

[57] ABSTRACT

Presented is a rotation control apparatus that may be motor driven or hand operated and which may be operated from a remote point. The apparatus includes an inner frame or cage adapted to be mounted on a suitable support in a stationary manner. Surrounding the inner frame or cage is an outer frame or cage that is adapted to rotate in relation to the stationary frame, the outer frame or cage being adapted to mount an object to be rotated under control of an operator. Drive means are interposed between the inner and outer frames or cages to effect controlled rotation of the outer frame.

10 Claims, 8 Drawing Figures

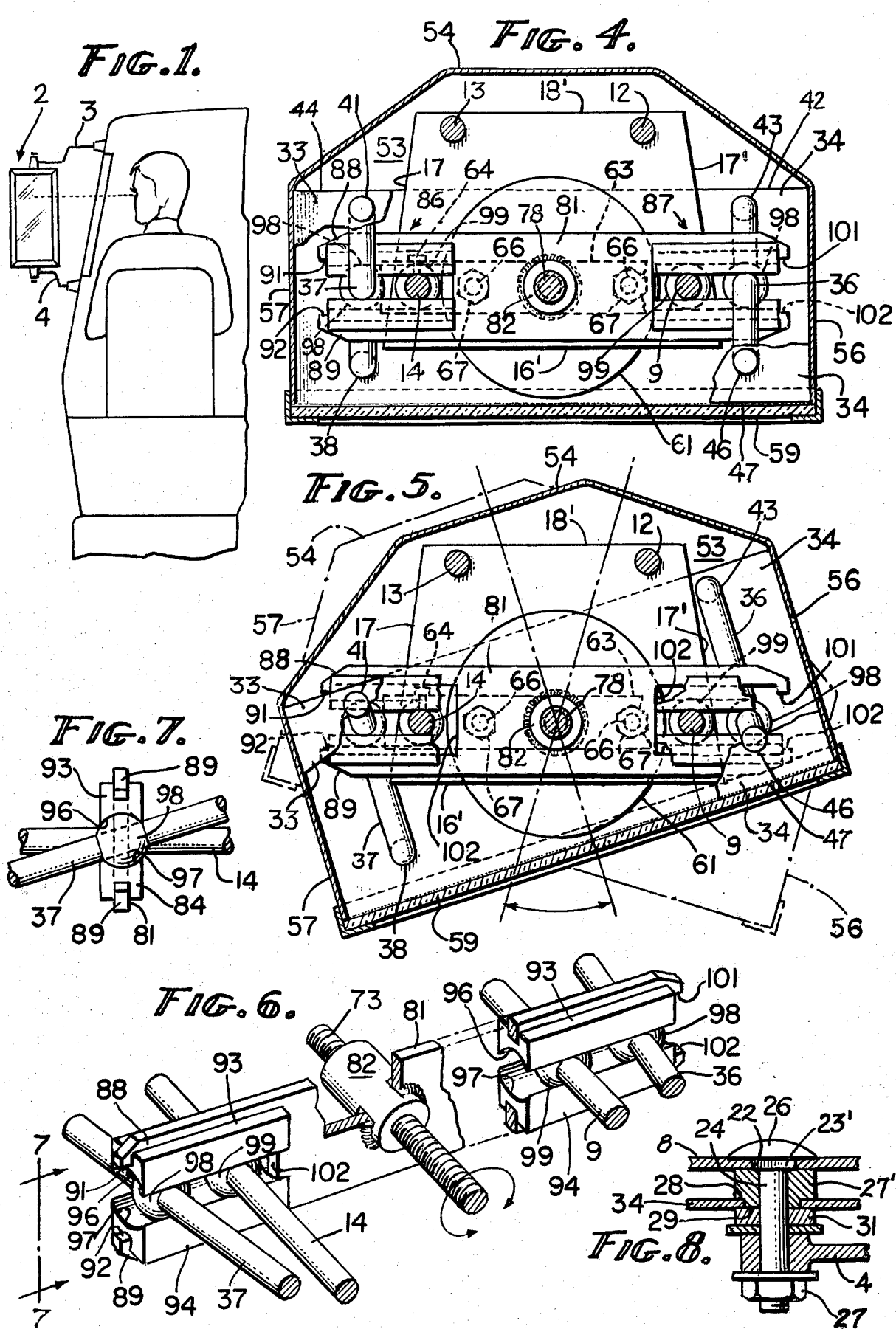

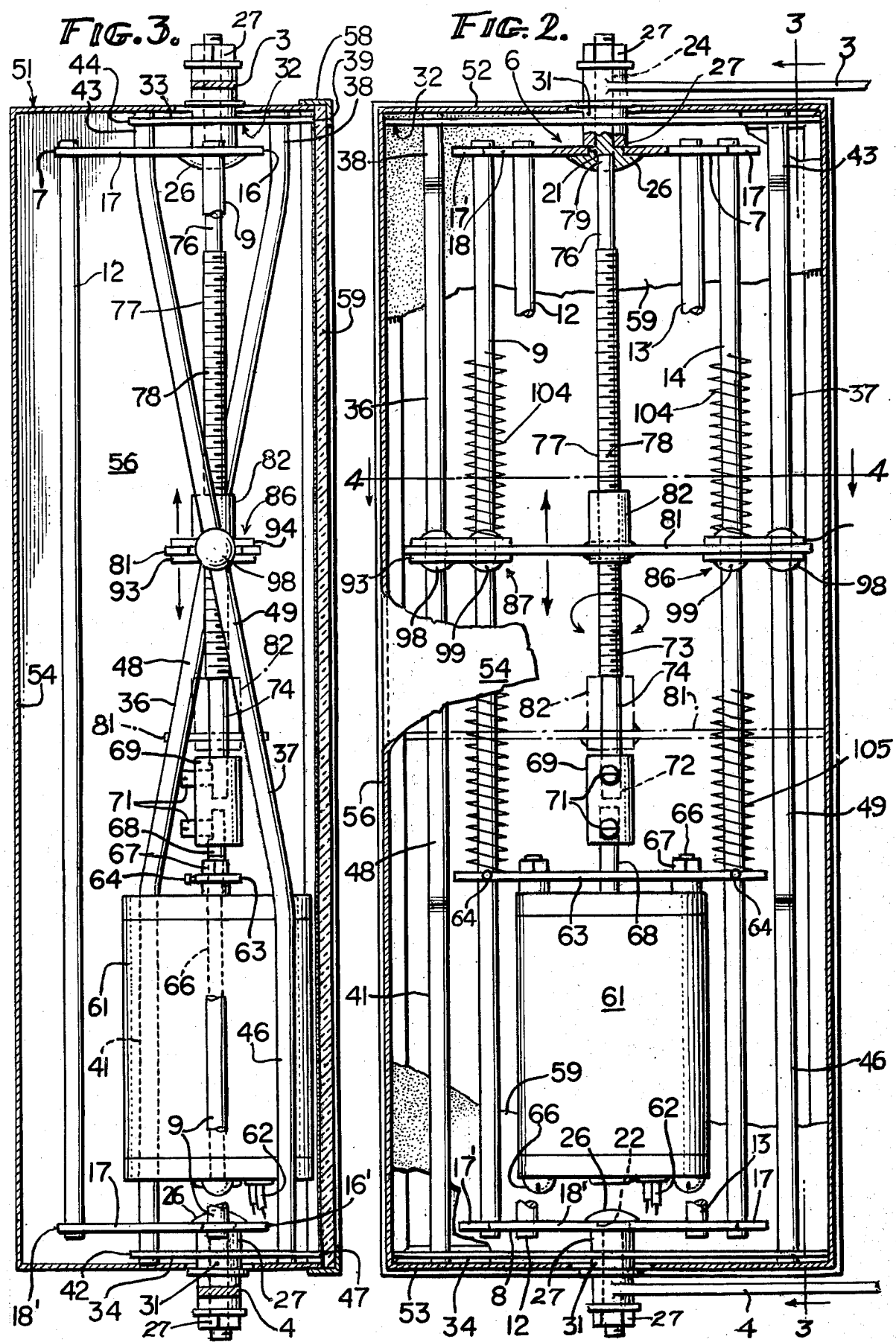

ROTATION CONTROL APPARATUS

BACKGROUND OF THE INVENTION

1. Field of the Invention

This invention relates to apparatus for supporting an object to be rotated through a pre-determined arc under the control of an operator stationed in close proximity to the apparatus and who may manually manipulate the apparatus, or by an operator that is stationed remote to the apparatus and who operates control means for effecting rotation of the support device. More specifically, the invention relates to a motor driven support structure that may be activated from a remote point to effect controlled rotation of the support structure. Specifically, the invention relates to the embodiment of such a rotation control apparatus in a side rear view mirror assembly adapted for installation on the cab of a motor vehicle.

2. Description of the Prior Art

There are many different applications for a rotation control apparatus or device that may be activated by someone in close proximity to the apparatus, such as by turning a knob, for instance, or which may be operated by a person from a remote location, such as, for instance, the driver of a truck who must control the position of the side rear view mirror on the right hand side of the cab. To exemplify the rotation control apparatus of this invention, the invention has been described and illustrated as an apparatus for the control of a side rear view mirror, however it should be understood that the invention is not limited to this embodiment since it may be embodied in many different ways to control rotation of any object.

For instance, a flood light may be mounted on this rotation control apparatus and caused to sweep back and forth under the direct control of an operator. In like manner, the rotation control apparatus may be utilized to support an advertising novelty that is being viewed by pedestrians passing a showcase or store front so that the display always follows or tracks a pedestrian as he passes. It is of course known that many different types of rotational control apparatuses and devices are taught by the prior art. For instance, the concept of motor driven side rear view mirrors is an old concept and a number of different structures have been utilized in an attempt to solve the problem presented by the need to adjust mirrors that are out of reach of the operator.

It has been found that conventional motor driven side rear view mirrors possess may disadvantages, not the least of which is the fact that the interconnection between the motor and the mirror is such that it causes vibration of the mirror, thus reducing visual acquity. The speed of the conventional electric motor is usually much greater than the required speed of rotation of the mirror and the reduction in speed poses a difficult problem. In most instances, conventional motor driven side view mirrors are connected to the motor drive through a complex and expensive system of reduction gears, and it has been found that accidental or intentional manipulation or rotation of the mirror by hand, such as when the mirror frame strikes a protruding object, often causes stripping of the reduction gears thus making the entire assembly inoperative. Accordingly, it is one of the objects of the present invention to provide a rotation control structure exceptionally simple in its construction yet sufficiently sturdy to support even heavy objects that require rotation under precise control.

Still another object of the invention is to provide a rotation control apparatus in which the degree of rotation is not dependent upon incremental steps of rotation of the drive motor, but which can be rotated smoothly through any selected degree without dependence upon the use of a stepping drive motor.

A still further object of the invention is the provision of a rotation control structure which does not utilize a reduction gear train between the drive means and the portion of the apparatus that rotates.

In most motor driven apparatuses that produce controlled rotation of an object, the object cannot be rotated by hand. Accordingly, another important object of the invention is the provision of a rotation control apparatus that may be operated or manipulated by hand or which may be motor driven either from close proximity to the apparatus or from a remote point.

As it relates to a side rear view mirror, one of the objects of the invention is to provide such a structure which may be operated by the driver of a motor vehicle in such a way that the mirror is positoned while the driver is seated in the position he normally occupies when he is driving.

In this aspect of the invention, another object is the provision of a motor driven side rear view mirror structure that may be retro-fitted on existing mirror arm assemblies or yokes.

The invention possesses other objects and features of advantage, some of which, with the foregoing, will be apparent from the following description and the drawings. It is to be understood that the invention is not limited to the embodiment illustrated and described, since it may be embodied in various forms within the scope of the appended claims.

SUMMARY OF THE INVENTION

In terms of broad inclusion, the rotation control apparatus of the invention comprises a stationary inner frame or cage adapted to be supported on a suitable supporting structure such as the cab of a truck when the apparatus is embodied in a side rear view mirror as illustrated in the drawings. A movable or rotatable outer frame or cage is journaled on the stationary frame and constructed so that the outer frame may be rotated about the inner frame. Drive means are supported on the inner frame and interconnect the inner and outer frames in such a way that controlled rotation of the outer frame may be effected from a remote point through activation of appropriate motor drive means mounted on the stationary inner frame. In the aspect of the invention related to a side rear view mirror embodiment, a reflective mirror is mounted on the outer frame for movement therewith.

BRIEF DESCRIPTION OF THE DRAWINGS

FIG. 1 is a fragmentary perspective view illustrating the embodiment of the invention in a side rear view mirror mounted on a truck cab.

FIG. 2 is a rear elevational view with portions of the housing broken away to reveal the internal construction of the apparatus as it is applied to a side rear view mirror structure.

FIG. 3 is a vertical sectional view taken in the plane indicated by the line 3—3 in FIG. 2.

FIG. 4 is a horizontal sectional view taken in the plane indicated by the line 4—4 in FIG. 2, with the view rotated 180° to correlate it to FIG. 1.

FIG. 5 is a horizontal sectional view similar to FIG. 4 but showing the mirror structure rotated to a different angle.

FIG. 6 is a fragmentary perspective view illustrating the relationship between the stationary and movable frames, the drive spindle and the drive plate.

FIG. 7 is a fragmentary perspective view of the bearing assembly between the drive plate and the stationary and movable frames.

FIG. 8 is a fragmentary sectional view illustrating the structure for holding the inner frame stationary.

DESCRIPTION OF THE PREFERRED EMBODIMENT

In terms of greater detail, the rotation control apparatus of the invention is illustrated as it is applied to a side rear view mirror of the type that is commonly used on large trucks or other types of vehicular equipment in which the left and right side rear view mirrors must be positioned so far from the driver of the vehicle that they cannot be conveniently reached for adjustment by the driver while he is seated in driving position. It should be understood that the basic apparatus for controlling rotation of the mirror, while shown and described as applied for this purpose, may be applied for rotating many other types of objects that require controlled rotation. As indicated above, flood lights, advertising novelties, manniquins in store windows, equipment set up for display, and many other applications are suitable for the basic mechanism.

Referring to the drawings, it will be seen from FIG. 1 that the rotation control apparatus is designated generally by the numeral 2, and is supported on mirror assembly arms 3 at the upper end and 4 at the lower end. It should be understood that no invention is claimed in these arms, the mirror arm assemblies being conventional and of various types to fit various types of vehicles. The basic rotation control apparatus comprises a stationary inner frame or cage designated generally by the numeral 6, the frame including a top support plate 7, a lower support plate 8, the two plates being spaced apart vertically and parallel, and retained in this relationship by longitudinally and vertically extending support rods 9, 12, 13 and 14.

As illustrated in FIGS. 3, 4 and 5, the upper and lower support plates 7 and 8 are provided with forward edges 16 and 16', respectively, and lateral edges 17 and 17' joined by rear edges 18 and 18'. It should be noted that the rods 9 and 14 are secured to the spaced plates 7 and 8 adjacent the forward edges 16 and 16', while the support rods 12 and 13 interengage the upper and lower support plates 7 and 8 adjacent the rear edges 18 and 18' thereof. The upper and lower plate 7 and 8 may be secured to the rods 9, 12, 13 and 14 in any suitable manner. It has been found that staking the plates provides a satisfactory structure. It will thus be seen that once fabricated, the inner frame 6 formed by the upper and lower plates 7 and 8 and the innerconnecting rods 9, 12, 13 and 14 forms a rigid frame or cage which may be mounted in stationary fashion on the upper and lower bracket arms 3 and 4 in a manner which will hereinafter be explained.

To accomplish such stationary mounting of the inner frame or cage, reference is made to FIG. 8, where it is shown that the plates 7 and 8 are provided with apertures 21 and 22 respectively, each of the apertures being square so as to receive therein the square portion 23 and 23' of a bolt 24 having a head 26 and secured by a nut 27.

As illustrated, the square shank portion 23' of the bolt engages the square aperture 22 in plate 8, while the remainder of the shank extends through a spacer bushing 27', rabbeted at 28 for purposes which will hereinafter be explained, and having a lower edge 29 that butts against the upper surface of a second spacer 31. The bracket arm 4 is attached to the assembly by means of the nut 27. The construction of these upper and lower bearing assemblies is essentially identical, so the description of one is applicable to the description of the other.

It will thus be seen that through the medium of the bearing assemblies at opposite ends of the stationary frame, the frame is held stationary on the bracket arms 3 and 4, the other ends of which are of course attached in a stationary manner (not shown) to the cab of a motor vehicle or some other appropriate supporting structure.

Pivotally mounted on the stationary support frame or inner cage 6 is a movable outer frame or cage designated generally by the numeral 32 and comprising an upper support plate 33 spaced above and lying parallel to the upper support plate 7 of the inner frame, and a lower support plate 34 lying spaced below and parallel to the lower support plate 8 of the inner frame. Plates 33 and 34 are apertured as illustrated in FIG. 8, the inner peripheral portion of each of the apertures being rotatably engaged in the rabbet 28 formed in the spacer 27. Thus, the outer frame or cage, by virtue of the upper and lower support plates being caught between the spacers 27 and 31, lies rotatably journaled on the bearing assemblies while being retained against axial movement in relation thereto.

The outer frame or cage includes longitudinally extending slide rods 36 and 37, the upper end portion 38 of the rod 36 being fixedly secured to the upper support plate 33 adjacent its forward edge 39, while the lower portion 41 of the rod 36 is fixedly attached to the lower plate 34 adjacent the rear edge 42 thereof. In like manner, with respect to the rod 37, the upper portion 43 of this rod is fixedly attached to the upper support plate 33 adjacent the rear edge 44 thereof, while the lower portion 46 of the rod 37 is fixedly attached to the lower support plate 34 adjacent the forward edge 47 thereof. Thus, with respect to the slide rod 36, the portion 48 thereof that lies intermediate the upper portion 38 and the lower portion 41 is inclined so that it extends forwardly toward the forward edge 39 of the upper support plate 33, while the intermediate section or portion 49 of the slide rod 37 is inclined rearwardly toward the rear edge of the upper support plate 44. This relationship of the two slide rods 36 and 37 is illustrated in FIG. 3.

It should be noted that the slide rods 36 and 37 forming a part of the outer movable support frame or cage 32 are set farther apart than the widest-set rods 9 and 14 of the inner support frame or cage. In other words, the slide rods 36 and 37 lie outboard of the rods 9 and 14 as illustrated in FIGS. 2, 4 and 5.

Suitably mounted on the upper and lower plates 33 and 34 of the movable outer support frame or cage is a housing designated generally by the numeral 51 and in connection with a side rear view mirror as illustrated and described herein, the housing includes a top wall 52, a bottom wall 53 joined by a back wall 54 and side walls 56 and 57. The front or forward end of the housing is open to receive an appropriate frame 58 formed generally rectangular in overall configuration and having an L-shaped cross section as illustrated in FIGS. 3-5.

Caught between the forward open end of the housing 51 and the radially inwardly extending flange of the frame 58 is a reflective mirror 59.

To effect pivotal movement of the mirror, or in the case of some other object required to be rotated through a controlled degree, drive means are provided interposed between the stationary inner support frame or cage 6 and the movable outer support frame or cage 32. Such drive means includes in the embodiment of a motor drive side rear view mirror as indicated a reversible electric motor 61 having appropriate leads 62 extending to a control switch, such as a toggle switch (not shown) appropriately located within the cab of a truck on which the mirror assembly is mounted and adapted to be digitally manipulated by the driver of the truck.

The electric motor 61 is securely fastened to a cross plate 63 fixedly mounted intermediately the ends of the support rods 9, 12, 13 and 14, and retained in this position by appropriate means such as set screws 64, or by staking the plate to the rods. The intermediate support plate 63 may conveniently be formed in the same general configuration as the upper and lower support plates 7 and 8, or it may be a transverse bar as shown, and is provided with two additional apertures through which the mounting bolts 66 of the motor extend to receive a lock nut 67 on the opposite side of the support plate to securely lock the drive motor 61 to the support plate.

The drive motor is provided with an upwardly extending drive shaft 68 that extends through an aperture in plate 63, and has a coupling device 69 suitably secured to the drive shaft by an appropriate set screw 71. The coupling device also engages the lower end portion 72 of a drive spindle 73, a lower portion 74 of which and an upper portion 76 of which are devoid of threads, while an intermediate portion 77 thereof is provided with threads 78 as shown. It should be understood that while threads have been illustrated, any other means equivalent to such threads may be utilized on a centrally disposed spindle as shown. The upper end of the spindle 73 is appropriately journaled in a bore 78 formed in the stationary head 26 of the upper bearing assembly as previously described. Thus, both ends of the spindle 73 are supported against axial and transverse displacement, while the spindle is arranged to rotate about its own longitudinal axis.

The spindle 73 has mounted intermediate its ends a transversely extending drive plate 81, the drive plate being provided with a central bearing portion 82 having internal threads adapted to threadably engage the threads 78 on the spindle so that rotation of the spindle by activation of the motor 61 in either a forward or reverse direction effects corresponding rotation of the spindle 73 and axial translation of the drive plate 81 in relation to the spindle. Rotation of the spindle is indicated in FIG. 2 by the curved arrow while axial translation of the drive plate 81 is also indicated by appropriate arrows in FIG. 2.

The drive plate 81 extends transversely across the stationary and movable support frames or cages, and opposite ends of the drive plate 81 slidably engage selected ones of the elongated rods forming portions of the stationary and movable support frames. Thus, as viewed in FIGS. 4-7, the outboard slide bearing assembly associated with the left end of the drive plate 81 as viewed in FIG. 4 is designated generally by the numeral 86 while the slide bearing assembly associated with the right end of the drive plate 81 as viewed in FIG. 4 is designated generally by the numeral 87. The structure of each slide bearing assembly is identical to the structure of the other and accordingly, in the interest of brevity in this description, only one will be described, it being understood that what is said about one will apply to the other.

Accordingly, with respect to the bearing assembly 86, it will be noted from FIGS. 4-7 that the slide bearing assembly is associated with longitudinally extending support rod 14 associated with the stationary support frame and is also associated with the adjacent outboard elongated slide rod 37 extending between the support plates 33 and 34 of the movable outer support frame. At the location of each of the bearing assemblies 86 and 87, the outboard end of the drive plate 81 is bifurcated to provide radially outwardly extending fingers 88 and 89 spaced apart and having parallel inner edges 91 and 92.

Mounted on the edge 91 and adapted to straddle the finger 88 is a bearing member 93 (FIG. 7) while a similar bearing member 94 is mounted on the edge 92 and straddles the finger 89. The bearing members 93 and 94 are provided, respectively, with inner periperal surfaces 96 and 97 that may be curved to conform to the spherical configuration of a bearing member 98 slidably disposed on the slide support rod 37, and a similar bearing member 99 slidably disposed on the support rod 14. As illustrated in FIG. 5, the ends of the bifurcated fingers 88 and 89 are provided with inwardly extending lug portions 101 between which and the inner end 102 of the space between the bifurcated fingers 88 and 89 the bearing members 93 and 94 are trapped. Thus, once the bearing members 93 and 94 are slipped into straddled relationship with the associated support fingers 88 and 89 and bearing members 98 and 99 are slipped between them, there is no way for the bearing assembly to become inadvertently disassembled. At the same time, because of the sliding relationship between each of the rods 37 and 14 and the associated bearing members 98 and 99, respectively, the drive plate 81 may slide longitudinally with respect to both the support rods 14 and 37 in connection with the bearing assembly 86, and slide longitudinally with respect to the support rods 9 and 36 with respect to the bearing assembly 87.

It will thus be seen that because the outboard end of the drive plate 81 straddles the support rods 9 and 14, and because these support rods are stationary, rotation of the spindle 73 will effect axial translation of the drive plate 81 with respect to the support rods 9 and 14 and will also cause axial displacement of the drive plate 81 with respect to the support rods 36 and 37 forming a part of the movable support frame or cage 32. Because the outboard portions of the drive plate 81 engage the support rods 36 and 37 in their intermediate inclined portions 48 and 49, it will be seen that axial translation of the drive plate 81 imposes a rotary moment on the support rods 36 and 37, and since these support rods form an integral part of the movable outer frame or cage, the entire outer frame or cage is caused to rotate about the central axis of the stationary support frame or cage 6. It should be noted that as viewed in FIGS. 4 and 5, upward translation of the drive plate 81 causes counterclockwise rotation of the outer support frame or cage, while movement of the drive plate downward into the position illustrated in broken lines in FIG. 2, causes clockwise rotation of the movable outer support frame or cage into the position illustrated in broken lines in FIG. 5.

When the drive plate 81 reaches its extreme of travel on the threaded spindle 73, say in a downward direction into the position illustrated in broken lines in FIG. 2, the bearing member 82 runs off the threads 78 and "free wheels" in the position illustrated in broken lines. This eliminates any strain being imposed on the central shaft by continued rotation of the motor 61 and eliminates one of the reasons why conventional motor driven side rear view mirror assemblies do not enjoy long life.

When the drive plate 81 has been driven to its lowermost position as illustrated in FIG. 2 in broken lines, the lower most peripheral portions of the bearing members 99 engage the upper ends of coil compression springs 103, one each of which is mounted on the support rods 9 and 14, the opposite ends of the coil compression springs 103 resiliently reacting against the upper surface of the intermediate support plate 63 as the spring is compressed. When the drive motor 61 drives the drive plate 81 into its uppermost position in which the internally threaded bearing member 82 lies in the section 76 of the spindle 73, the upper peripheral portion of the bearing members 99 slidably mounted on the slide rods 9 and 14 engage the lower ends of coil compression springs 104 and compress these springs so that a resilient biasing force is imposed on the drive plate 81, tending to drive the drive plate downwarldy to facilitate rethreading or reengagement of the bearing member 82 with the threaded spindle 73 at each end of its normal excursion.

Having thus described the invention, what is claimed as novel and sought to be protected by Letters Patent of the United States is as follows:

1. An apparatus for controlling the rotation of an object supported on the apparatus, comprising:
   (a) a stationary inner cage including spaced end plates held apart and interconnected by a plurality of elongated rods;
   (b) a movable outer cage including spaced end plates journaled on the stationary inner cage and interconnected by a pair of elongated rods portions of which are inclined in opposite directions, said object to be rotated being supportable on said outer cage; and
   (c) drive means mounted on said stationary inner cage and interconnecting the inclined portions of said pair of elongated rods of said outer cage whereby activation of said drive means causes rotation of said outer cage in relation to said inner cage.

2. The combination according to claim 1, in which said drive means includes an elongated drive shaft journaled for selective rotation on said inner cage, and a drive plate mounted on said drive shaft for axial translation therealong upon rotation of said shaft, said drive plate slidably engaging at least one of said elongated rods on each of said inner and outer cages whereby axial translation of said drive plate causes rotational movement of the outer cage in relation to the inner cage.

3. The combination according to claim 1, in which said drive means includes a remotely controllable reversible motor having a drive shaft and mounted on said inner cage, and means interconnecting the drive shaft of said motor with the inclined portions of said pair of elongated rods of said outer cage whereby rotation of said drive shaft upon activation of the reversible motor effects rotation of the outer cage and the object supported thereon.

4. The combination according to claim 2, in which said drive plate is symmetrical on opposite sides of said drive shaft and slidably engages two of said elongated rods on each of said inner and outer cages.

5. The combination according to claim 1, in which said drive means includes a drive plate slidably engaging selected ones of said elongated rods on said inner and outer cages, and means for effecting axial translation of said drive plate along said rods whereby a rotative moment is imposed on said outer cage to effect rotation thereof in relation to the inner cage.

6. An apparatus for rotatably supporting an object to be selectively rotated from one position to another, comprising:
   (a) a stationary support frame;
   (b) means mounted on said support frame having a drive shaft extending therefrom adapted for selective rotation in a clockwise or counterclockwise direction;
   (c) a movable support frame movably mounted on said stationary support frame for selective movement in relation thereto and on which an object to be moved may be mounted, and
   (d) drive means interconnecting said drive shaft, said stationary support frame and said movable support frame and actuable to effect selective rotation of said movable support frame;
   (e) said movable support frame including upper and lower support plates spaced apart and having corresponding front and rear edges, and a pair of rods interconnecting said spaced plates, the lower end of one rod being attached to the lower plate adjacent its front edge and having its upper end attached to the upper plate adjacent its rear edge, while the other rod of the pair has its lower end attached to the lower plate adjacent the rear edge thereof and having its upper end attached to the upper plate adjacent the front edge thereof.

7. An apparatus for rotatably supporting an object to be selectively rotated from one position to another, comprising:
   (a) a stationary support frame;
   (b) means mounted on said support frame having a drive shaft extending therefrom adapted for selective rotation in a clockwise or counterclockwise direction;
   (c) a movable support frame movably mounted on said stationary support frame for selective movement in relation thereto and on which an object to be moved may be mounted, and
   (d) drive means interconnecting said drive shaft, said stationary support frame and said movable support frame and actuable to effect selective rotation of said movable support frame;
   (e) said movable support frame including upper and lower support plates spaced apart, and a pair of spaced rods interconnecting said spaced plates, said spaced rods having portions inclined in opposite directions.

8. An apparatus for rotatably supporting an object to be selectively rotated from one position to another, comprising:
   (a) a stationary support frame;
   (b) means mounted on said support frame having a drive shaft extending therefrom adapted for selective rotation in a clockwise or counterclockwise direction;
   (c) a movable support frame movably mounted on said stationary support frame for selective movement in relation thereto and on which an object to be moved may be mounted, and (d) drive means interconnecting said drive shaft, said stationary support frame and said movable support frame and actuable to effect selective rotation of said movable support frame;

(e) said stationary support frame including upper and lower spaced stationary support plates, a plurality of elongated rods interconnecting said spaced stationary support plates; said movable support frame including spaced upper and lower movable support plates, and a pair of elongated rods interconnecting said spaced upper and lower movable support plates, portions of said pair of elongated rods being inclined in opposite directions, and said drive means interconnecting said drive shaft, said stationary support frame and said movable support frame includes an elongated spindle adapted for selective rotation in a clockwise or counter-clockwise direction and a drive plate mounted on said elongated spindle and being axially translatable therealong upon rotation of said spindle, opposite end portions of said drive plate slidably engaging the inclined portions of said pair of rods whereby axial translation of said drive plate in one direction will cause rotative movement of the movable frame in one direction and axial translation of said drive plate in the opposite direction causes rotative movement of the movable frame in the other direction.

9. A remote-controlled mirror assembly, comprising:

(a) a stationary assembly support frame adapted for attachment to a supporting structure;

(b) a mirror support frame pivotally mounted on said stationary assembly support frame for pivotal movement in relation thereto and including a mirror mounted thereon; and (c) drive means interconnecting said stationary assembly frame and said mirror support frame to effect selective pivotal movement of said mirror support frame and mirror;

(d) said mirror support frame including upper and lower support plates spaced apart and interconnected by a pair of spaced rods portion of which are inclined in opposite directions, and said drive means includes a non-rotative drive plate axially translatable along the inclined portions of said rods, opposite ends of said drive plate engaging the oppositely inclined portions of said rods whereby non-rotative axial displacement of the drive plate effects rotative displacement of the mirror support frame and mirror.

10. A remote-controlled mirror assembly, comprising:

(a) a stationary assembly support frame for attachment to a supporting structure;

(b) a mirror support frame pivotally mounted on such stationary assembly support frame for pivotal movement in relation thereto about a pivotal axis and including a mirror mounted thereon;

(c) drive means including a reversible motor having a drive shaft and a drive plate interconnecting said stationary assembly frame and said mirror support frame on opposite sides of said pivotal axis to effect selective pivotal movement of said mirror support frame and mirror;

(d) said drive means including an elongated rotatable spindle journaled at one end on said stationary assembly support frame and connected at its other end to the drive shaft of said reversible motor; and (e) a drive plate mounted on said spindle for axial translation therealong upon rotation thereof and engaging said stationary assembly support frame and said mirror support frame on opposite sides of said pivotal axis to effect rotation of the mirror support frame upon axial translation of the drive plate by imposing a rotational moment on opposite sides of said mirror support frame.

* * * * *